US005853860A

United States Patent [19]

Calvert

[11] Patent Number: 5,853,860

[45] **Date of Patent: *Dec. 29, 1998**

[54] LID HAVING A CURED OVERPRINT VARNISH

[75] Inventor: Barry Gene Calvert, Covington, Va.

[73] Assignee: Westvaco Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 688,639

[22] Filed: Jul. 29, 1996

Related U.S. Application Data

[63] Continuation of Ser. No. 420,775, Apr. 12, 1995, abandoned.

[51] Int. Cl.[6] .............................. B32B 5/02; B32B 19/06; B32B 21/12; B32B 27/16

[52] U.S. Cl. ........................ 428/204; 428/34.3; 428/36.6; 428/201; 428/203; 428/206; 428/211; 428/347; 428/452; 428/454; 428/537.5

[58] Field of Search ................................ 428/34.2, 35.7, 428/195, 201, 203, 204, 206, 207, 208, 211, 481, 511, 537.5, 34.3, 36.6, 347, 349, 452, 454

[56] References Cited

U.S. PATENT DOCUMENTS

| | | | |
|---|---|---|---|
| 4,146,033 | 3/1979 | Ide et al. | 128/348 |
| 4,170,681 | 10/1979 | Edwards et al. | 428/205 |
| 4,204,010 | 5/1980 | Kramm et al. | 427/44 |
| 4,218,294 | 8/1980 | Brack | 204/159.13 |
| 4,227,979 | 10/1980 | Humke et al. | 204/159.16 |
| 4,261,504 | 4/1981 | Cowan | 229/43 |
| 4,387,551 | 6/1983 | Cowan | 53/478 |
| 4,595,611 | 6/1986 | Quick et al. | 428/35 |
| 4,757,940 | 7/1988 | Quick et al. | 229/3.5 R |
| 4,830,902 | 5/1989 | Plantenga et al. | 428/207 |
| 4,933,212 | 6/1990 | Gerstner et al. | 427/258 |
| 5,032,424 | 7/1991 | Carlson et al. | 427/56.1 |
| 5,035,946 | 7/1991 | Baker et al. | 428/327 |
| 5,041,941 | 8/1991 | Carter et al. | 361/225 |
| 5,217,159 | 6/1993 | Calvert et al. | 229/3.1 |
| 5,228,272 | 7/1993 | Calvert et al. | 53/477 |
| 5,252,384 | 10/1993 | Bothe et al. | 428/212 |
| 5,266,384 | 11/1993 | O'Dell et al. | 428/207 |
| 5,286,547 | 2/1994 | Tyerman | 428/195 |
| 5,356,070 | 10/1994 | Rigby | 229/120.17 |

*Primary Examiner*—Vivian Chen
*Attorney, Agent, or Firm*—J. R. McDaniel; R. L. Schmalz

[57] ABSTRACT

Paperboard lids for containers comprising of a paperboard substrate, a coating of particulate minerals, a printed layer, and a radiation cured overprint varnish wherein the overprint varnish is mass stable and heat resistant above 325° F. and does not distort or stick during platen heat sealing.

4 Claims, 1 Drawing Sheet

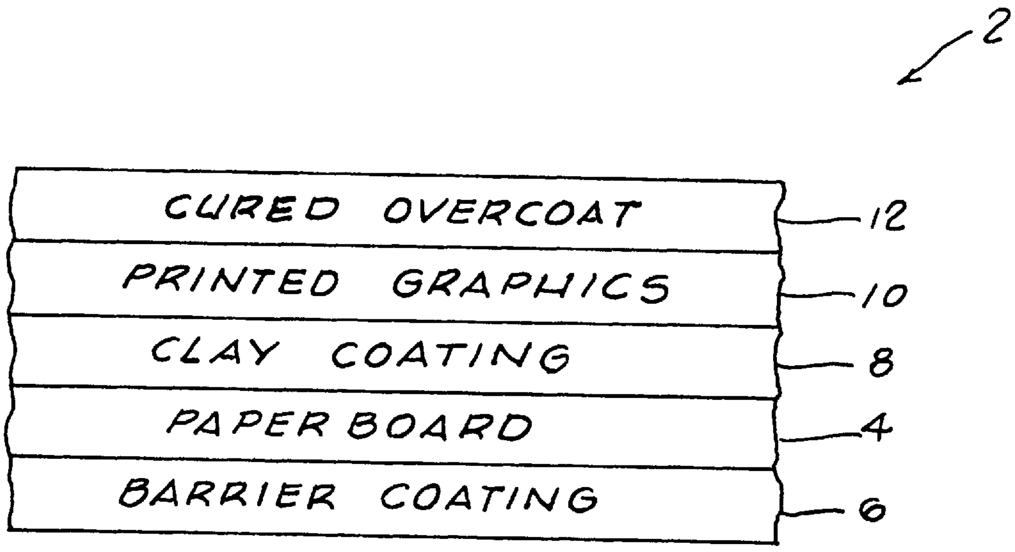
FIGURE

LID HAVING A CURED OVERPRINT VARNISH

This application is a continuation of application Ser. No. 08/420,775, filed Apr. 12, 1995, abandoned.

BACKGROUND OF THE INVENTION

1. Field of the Invention

This invention relates to paperboard lids having a radiation cured overprint varnish. Such structures of this type, generally, protect the graphics which are printed upon the paperboard lid such that the graphics are not distorted and/or marred.

2. Description of the Related Art

Platen sealing is gaining popularity for attaching paperboard lids to trays following product filling. The benefits of this method include more uniform seals, simpler equipment operation, and the ability to seal through food contamination. A major disadvantage with this method is that the heated platen can blemish the outside surface of the lid which contains important sales graphics and, in some cases, UPC symbols. The blemished or marred surface results in an unsatisfactory package appearance and, in some cases, UPC symbols which cannot be scanned.

It is known, in coating systems, to make use of a varnish layer to protect a printed surface. Exemplary of such prior art is U.S. Pat. No. 4,170,681 ('681) to J. R. Edwards et al., entitled "Method of Applying a Varnish Layer to a Printed Surface and Product Made Thereby". While the '681 reference teaches the use of a varnish layer to provide a smooth protective surface for the printed graphics, the nature of the varnish layer is such that it is not heat resistant (mass stable) to temperatures above 325° F. and also the varnish is not radiation cured. Consequently, an advantageous overprint varnish would be one which is both heat resistant and radiation cured.

It is apparent from the above that there exists a need in the art for an overprint varnish which is capable of protecting the graphics printed upon the lid, but which at the same time is heat resistant and radiation cured. It is a purpose of this invention to fulfill this and other needs in the art in a manner more apparent to the skilled artisan once given the following disclosure.

SUMMARY OF THE INVENTION

Generally speaking, this invention fulfills these needs by providing a composite lid having an overprint varnish, comprising a paperboard substrate having first and second sides, a coating of particulate minerals located exterior to the first side of the substrate, a layer of printed graphics located exterior to the coating of particulate minerals, a coating of a radiation-cured, heat resistant varnish located exterior to the layer of printed graphics, and a layer of a heat sealable barrier material located exterior to the second side of the substrate.

In certain preferred embodiments, the particulate minerals are clay. Also, the varnish coating is cured by either electron beam or ultraviolet radiation.

In another further preferred embodiment, the radiation-cured varnish overcoat protects the printed graphics from distortion and/or marring.

The preferred lid, according to this invention, offers the following advantages: lightness in weight; ease of assembly; good stability; good durability; excellent printed graphics protection; and excellent economy. In fact, in many of the preferred embodiments, these factors of ease of assembly, graphics protection, and economy are optimized to the extent that is considerably higher than heretofore achieved in prior, known composite lids.

BRIEF DESCRIPTION OF THE DRAWING

The subject matter which is regarded as the invention is particularly pointed out and distinctly claimed in the concluding portion of the specification. The invention, however, may be best understood by reference to the following description taken in conjunction with the accompanying drawing Figure which is a schematic illustration of a composite lid with a cured overprint varnish, according to the present invention.

DETAILED DESCRIPTION OF THE INVENTION

Cartons which are used for distributing, marketing, and, in some cases, heating portions of prepared foods are fabricated with a paperboard structural substrate. The basic carton design consists of a vessel to hold the product and a lid which is at least partially sealed to peripheral flanges extending from the vessel sidewalls. See, for example, commonly assigned U.S. Pat. No. 5,356,070 ('070) to W. R. Rigby, entitled "Partitioned Paperboard Food Tray," which is incorporated in its entirety by reference. The lid may also be integral with the vessel in some cases. See, for example, commonly assigned U.S. Pat. No. 5,228,272 ('272) to B. G. Calvert et al., entitled "Product and Process for Heat Sealing a Paperboard Carton Having Polymer Coating on One Side Only," which is incorporated in its entirety by reference.

The basic substrate material for the present invention is machine-made paperboard which may range in thickness from 0.007 to 0.035 inches. The paperboard substrate may be coated on one or both sides with a layer of particulate minerals. The surface of the lid next to the food product must be coated with a material which provides a barrier and is heat sealable to the vessel flanges. Coatings which may provide this are, typically, extruded polymers such as polyethylene terephthalate (PET), polypropylene (PP), and polyethylene (PE). Finally, the exterior surface of the lid may be printed with sales graphics such that these graphics are printed onto the particulate mineral layer located on the base substrate.

With this background, and with reference to the Figure, there is illustrated composite lid structure 2. Lid 2 includes in part, conventional paperboard substrate 4, conventional barrier coating 6, conventional particulate mineral layer 8, conventional printed graphics layer 10, and radiation-cured overprint varnish layer 12.

As discussed earlier, barrier coating 6 must provide a barrier and be heat sealable to the flanges of the vessel (not shown). See, for example, FIGS. 1 and 3 of the above-identified ('070) and ('272) patents, respectively. Preferably, the barrier is constructed of either PET, PP, or PE. Particulate mineral layer 8, preferably, is constructed of clay. Finally, the graphics are printed upon particulate mineral layer 8 by any conventional printing techniques.

It is imperative that during attachment or sealing of the lid to the vessel that the sales graphics 10 should not be distorted or marred. In order to avoid this, radiation-cured overprint varnish layer 12 is placed over printed graphics layer 10 such that layer 12 does not stick to the heated platen and remains mass stable above 325° F.

Two processes, namely, Electron Beam (EB) and Ultraviolet Curing (UV), may be used to produce the radiation-cured overprint varnish layer 12. In the EB process, a coating (having 100% solids) is applied to the substrate in a liquid state following printing of sales graphic layer 10. The coating is then exposed to highly accelerated electrons and reaction occurs in which the chemical bonds in the coating are broken and a new-modified overprint varnish layer 12 is formed. This process is referred to as polymerization. The polymerization causes significant physical changes in the product being treated and results in many desirable characteristics such as heat and scuff resistance.

The UV process is similar in that the coating (having 100% solids) is applied in a liquid state over the printed graphics layer 10. The coating is then exposed to a UV light source. Photochemical initiators in the coating form free radicals. The free radicals initiate the cross linking of monomers and oligomers, which result in a rapid curing of the overprint varnish layer 12. As with the EB process, a durable overprint varnish layer 12 suitable for platen heat sealing systems is produced.

With respect to the use of a radiation-cured varnish, the information below clearly indicates the superior performance of the coatings of the present invention (RAD.) as opposed to the conventional coatings (STD.).

The temperature range covered is typical for the applications previously described. The sealing pressure can be much greater. A higher pressure would intensify the problem indicated with the standard coating. The dwell times cover a typical range depending upon the polymer being sealed and the board caliper (thickness).

TEST CONDITIONS

Equipment: Sentinel Bar (1.0") Sealer
Position of Sample: Printed surface next to heated bar
Samples Tested: STD.=Standard water-based ink and varnish RAD.=Radiation-cured ink and varnish
Pressure: 60 psig
Dwell Time: 1 and 3 seconds
Grading:

1. No indication of marring
2. Slight dulling of surface
3. Dulling of surface and slight ink picking
4. Dulling of surface, ink picking, and slight discoloration
5. Severe discoloration, ink picking, and dulling

GRADE

| | 1.0-Second Dwell Time | | 3.0-Second Dwell Time | |
|---|---|---|---|---|
| Temp. °F. | STD. | RAD. | STD. | RAD. |
| 325 | 2 | 1 | 2 | 1 |
| 350 | 2 | 1 | 3 | 1 |
| 375 | 3 | 1 | 3 | 1 |
| 400 | 3 | 1 | 3 | 1 |
| 425 | 3 | 1 | 4 | 1 |
| 450 | 4 | 1 | 5 | 1 |
| 475 | 4 | 1 | 5 | 1 |
| 500 | 5 | 1 | 5 | 2 |

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A composite lid having an overprint varnish, which is used to cover a food-containing tray, wherein said composite lid is comprised of:

a paperboard substrate having first and second sides;

a coating of particulate minerals located exterior to said first side of said substrate;

a layer of printed graphics located exterior to said coating of particulate minerals;

a coating of a radiation-cured, heat resistant varnish located exterior to said layer of printed graphics, wherein said radiation-cured varnish is mass stable above 325° F. and said varnish substantially prevents said layer of printed graphics from being distorted during a pressure platen heat sealing of said composite lid to a vessel and said varnish does not substantially adhere to said platen during said heat sealing wherein said pressure is at or around 60 psig; and a layer of a heat sealable barrier material located exterior to said second side of said substrate.

2. The composite lid, as in claim 1, wherein said lid comprises:

a coating of particulate minerals located exterior to said second side of said substrate and interior to said barrier layer.

3. The composite lid, as in claim 2, wherein said particulate minerals are comprised of clay.

4. The composite lid, as in claim 1, wherein said particulate minerals are comprised of clay.

* * * * *